United States Patent
Valencia

(10) Patent No.: US 8,961,033 B2
(45) Date of Patent: Feb. 24, 2015

(54) OPTICAL CONTACT AND MULTICONTACT CONNECTOR

(75) Inventor: Laurent Valencia, Saint-Genix sur Guiers (FR)

(73) Assignee: Radiall, Rosny-sous-Bois (FR)

( * ) Notice: Subject to any disclaimer, the term of this patent is extended or adjusted under 35 U.S.C. 154(b) by 202 days.

(21) Appl. No.: 13/271,743

(22) Filed: Oct. 12, 2011

(65) Prior Publication Data

US 2012/0099819 A1   Apr. 26, 2012

(30) Foreign Application Priority Data

Oct. 22, 2010   (FR) ...................................... 10 58676

(51) Int. Cl.
*G02B 6/36* (2006.01)
*G02B 6/38* (2006.01)

(52) U.S. Cl.
CPC .............. *G02B 6/383* (2013.01); *G02B 6/3885* (2013.01); *G02B 6/3821* (2013.01); *G02B 6/3847* (2013.01); *G02B 6/387* (2013.01); *G02B 6/3875* (2013.01); *G02B 6/3879* (2013.01); *G02B 6/3882* (2013.01)
USPC .................. 385/60; 385/72; 385/78

(58) Field of Classification Search
USPC .................. 385/54, 60, 72, 77, 78
See application file for complete search history.

(56) References Cited

U.S. PATENT DOCUMENTS

| | | | | |
|---|---|---|---|---|
| 4,312,564 A | * | 1/1982 | Cefarelli et al. ................. | 385/59 |
| 5,155,784 A | * | 10/1992 | Knott .............................. | 385/88 |
| 5,619,604 A | * | 4/1997 | Shiflett et al. ................... | 385/59 |
| 5,689,598 A | * | 11/1997 | Dean et al. ...................... | 385/59 |
| 6,116,788 A |  | 9/2000 | Melchior et al. | |
| 6,371,659 B1 |  | 4/2002 | Weigel | |
| 6,421,495 B1 | * | 7/2002 | Hoffmeister et al. ......... | 385/139 |
| 6,450,697 B1 | * | 9/2002 | Ngo ............................... | 385/78 |
| 6,450,698 B1 |  | 9/2002 | Chen et al. | |
| 6,485,192 B1 | * | 11/2002 | Plotts et al. ..................... | 385/75 |
| 6,702,479 B2 | * | 3/2004 | Yang .............................. | 385/78 |
| 6,719,927 B2 | * | 4/2004 | Sakurai et al. ............... | 264/1.25 |
| 6,776,645 B2 | * | 8/2004 | Roth et al. .................... | 439/352 |
| 6,832,858 B2 | * | 12/2004 | Roth et al. ...................... | 385/71 |
| 6,899,468 B2 | * | 5/2005 | Ngo et al. ....................... | 385/87 |

(Continued)

FOREIGN PATENT DOCUMENTS

EP    0 505 197 A2    9/1992
EP    1 092 995 A2    4/2001

(Continued)

OTHER PUBLICATIONS

French Search Report issued in French Patent Application No. 10 58676 on Feb. 14, 2011 (with translation).

(Continued)

*Primary Examiner* — Daniel Petkovsek
(74) *Attorney, Agent, or Firm* — Oliff PLC

(57) ABSTRACT

An optical contact having a ferrule extending along a longitudinal axis, the ferrule having a front face facing an optical contact of complementary type when the optical contact is connected to the optical contact of complementary type, and a rear face opposite from the front face, and a body within which the ferrule is received in optionally movable manner, the body including at least one portion surrounding the outside of the ferrule around the longitudinal axis thereof, and at least one portion extending beyond the rear face of the ferrule towards the outside thereof.

16 Claims, 3 Drawing Sheets

(56) References Cited

U.S. PATENT DOCUMENTS

| | | | |
|---|---|---|---|
| 7,537,393 B2 * | 5/2009 | Anderson et al. | 385/54 |
| 7,572,063 B2 * | 8/2009 | Mynott et al. | 385/56 |
| 7,651,278 B2 * | 1/2010 | Kiani et al. | 385/78 |
| 7,988,368 B2 * | 8/2011 | Sakurai et al. | 385/60 |
| 8,157,455 B2 * | 4/2012 | Miyazaki | 385/54 |
| 2006/0002659 A1 | 1/2006 | Kiani et al. | |
| 2009/0097799 A1 | 4/2009 | Sakirai et al. | |
| 2012/0033921 A1 * | 2/2012 | Haley et al. | 385/78 |

FOREIGN PATENT DOCUMENTS

| | | |
|---|---|---|
| EP | 1 107 032 A1 | 6/2001 |
| EP | 0 886 798 B1 | 12/2001 |
| WO | WO 2006/086153 A1 | 8/2006 |

OTHER PUBLICATIONS

Written Opinion issued in French Patent Application No. 10 58676 on Feb. 14, 2011 (with translation).

\* cited by examiner

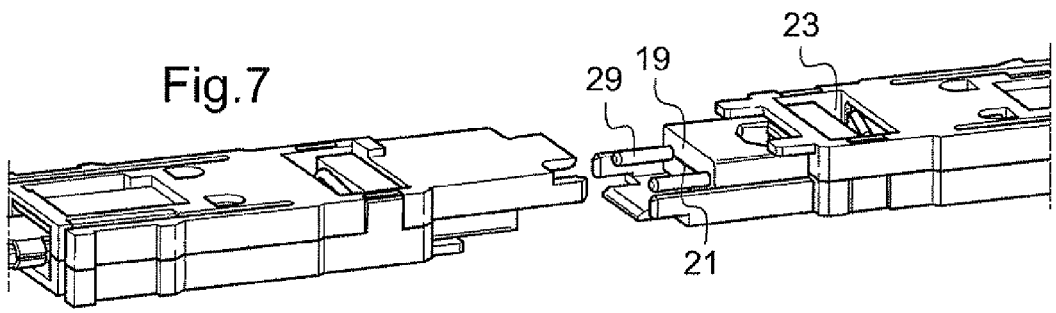
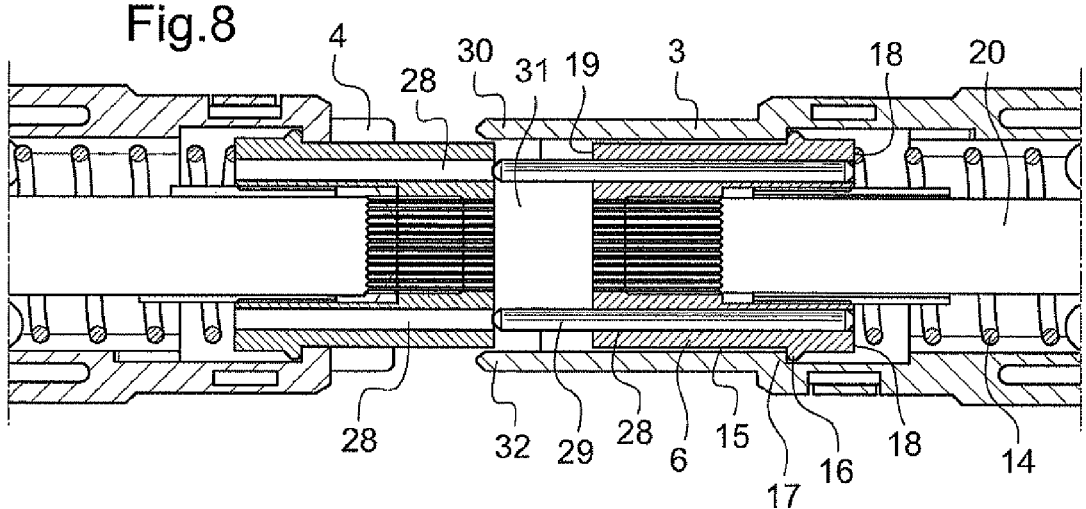
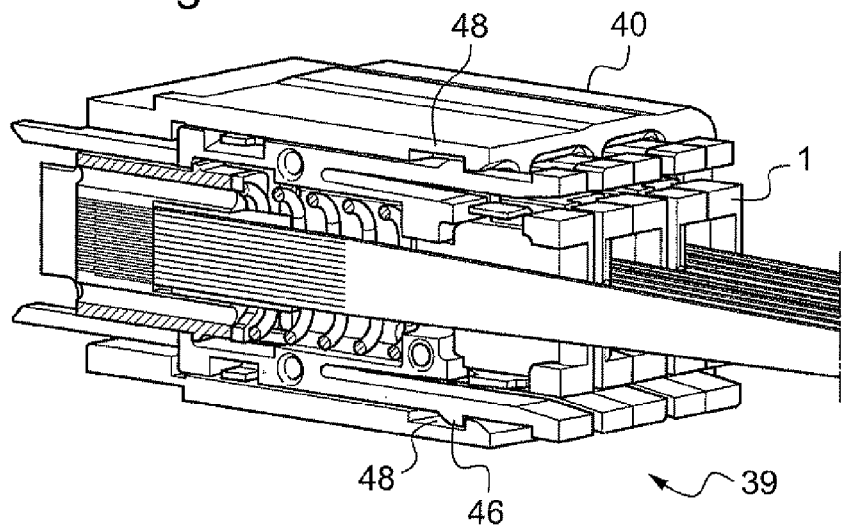

OPTICAL CONTACT AND MULTICONTACT CONNECTOR

The present application claims the priority of French patent application FR 10 58676, filed Oct. 22, 2010.

FIELD OF THE INVENTION

The present invention provides an optical contact and also a multicontact connector including at least one such optical contact.

BACKGROUND OF THE INVENTION

In order to make optical connections, it is known to make use of optical contacts that include ferrules receiving the ends of ribbons carrying optical fibers. By way of example, these may be mechanical transfer MT ferrules. In known optical contacts, the face via which a ferrule comes into contact with the ferrule of a contact of complementary type is not protected against impacts or against scratching that can occur while the optical contact is being handled, in particular while it is being inserted into a multicontact connector.

Furthermore, when such contacts are used in rack connectors or backplane connectors, making connections therebetween can lead to lateral and/or angular offsets. Male type MT ferrules may include pins for recentering two contacts of complementary type that are to be connected together. Nevertheless, such pins present chamfers that are small and unsuitable for compensating large offsets between two contacts that are to be connected together. That is why it is known, e.g. from U.S. Pat. No. 6,116,788, to have recourse to a repositioning system for placing between two contacts to be connected together.

Furthermore, a known optical contact is generally mounted by arranging the various elements of the optical contact one after another along an axis. If, during assembly of the contact, one of its elements is forgotten, or if an element is poorly mounted, or if a contact element is damaged, e.g. during insertion of the contact into a connector or into a polymerization oven, it can be found necessary to disassemble the optical contact assembly.

There exists a need to remedy the above-mentioned drawbacks in full or in part.

Object and Summary of the Invention

The invention satisfies this need by means of an optical contact, comprising:
 a ferrule extending along a longitudinal axis, the ferrule having a front face facing an optical contact of complementary type when said optical contact is connected to said optical contact of complementary type, and a rear face opposite from said front face; and
 a body within which the ferrule is received in optionally movable manner, the body including at least one portion surrounding the outside of the ferrule around the longitudinal axis thereof, and at least one portion extending beyond the rear face of the ferrule towards the outside thereof;
 wherein the end of the body facing an optical contact of complementary type when said optical contact is connected to said optical contact of complementary type includes at least one portion extending beyond the front face of the ferrule towards the outside thereof, for any position of the ferrule inside the body, and by the fact that said end of the body also includes at least one portion beyond which the front face of the ferrule extends.

According to the invention, because of the configuration of the body, the ferrule is arranged inside the body and the front face of the ferrule is protected when the ferrule is placed in the body. The ferrule can thus be encapsulated in the body. Thus, the risks of damaging the ferrule while handling the optical contact, and in particular while inserting it into a multicontact connector unit, are reduced.

The ferrule may be an MT optical ferrule or any other type of optical ferrule or any active component enabling optical signals to be generated or received.

The ferrule may be mounted to move inside the body along an axis parallel to its longitudinal axis. By way of example, the contact may include a spring mounted inside the body with one end bearing directly or indirectly (i.e. with or without intermediate parts) against the rear face of the ferrule. The spring may be encapsulated in the body.

The body may be configured in such a manner as to receive only one ferrule. The ferrule may come directly into contact with the body when it is received therein, without any intermediate part.

The ferrule may have a rectangular cross-section and each of the sides of the ferrule may include a shoulder that comes into abutment with a corresponding shoulder of the body in order to define an abutment against forward movement of the ferrule inside the body. In the meaning of the invention, at least a portion of the body extends beyond the front face of the ferrule towards the outside thereof when the ferrule is in said position defining forward abutment.

Maximum compression of the spring, as determined by its stiffness, may define an abutment against rearward movement of the ferrule in the body.

The contact may be of the male type and it may include at least one pin and a housing for receiving said pin, which pin may be arranged parallel to the axis of the ferrule when it is mounted in said housing, the pin extending beyond the front face of the ferrule towards the outside thereof over a second distance, said portion of the body extending beyond the front face of the ferrule including at least one arm extending beyond the front face of the ferrule towards the outside thereof over a first distance that is longer than the second distance. By means of this configuration of the arm, the body may include a portion that projects beyond the pins of the male-type contact. When it is desired to connect together two contacts of complementary type, said arm(s) may enable a first alignment step to be performed with the ferrule of the female-type contact before it comes into contact with the pins of the ferrule of the male-type contact, which pins enable a second alignment step to be performed on the female-type contact relative to the male-type contact, thereby facilitating and improving the centering of two optical contacts of complementary type while they are being connected together.

The portion extending beyond the front face of the ferrule may for example include two arms and each of these two arms may extend a wall of the body that is in contact with a side of the ferrule. The distance between the two arms may, for example, correspond to the distance between the two sides of the ferrule.

The body may be made up of at least two parts, each of said parts including means for enabling one part to be releasably assembled with another part, said means being configured in such a manner that said parts are assembled and disassembled by exerting a force on the parts perpendicularly to the longitudinal axis of the ferrule. Because of this configuration of the assembly means, it can be simple and inexpensive to repair or modify the optical contact, since there is no longer any need to re-cable the ferrule.

The portion of the end of the body that extends beyond the front face of the ferrule towards the outside thereof may be carried by only one of the parts of the body, and the portion of said end of the body beyond which the front face of the ferrule can extend may be carried by another one of said parts forming the body.

By way of example, the body may be made of two parts. Under such circumstances, each part may include a cutout in a side face, such that when the two parts are assembled together, the cutouts face each other.

The contact may present a cross-section that is rectangular, extending along an axis parallel to the axis along which the ferrule extends when it is received in the body.

Other exemplary embodiments of the invention also provide a multicontact connector including a unit in which there is received at least one contact as defined above.

By way of example, the unit may include a plurality of superposed housings enabling contacts to be stacked in the unit.

Other exemplary embodiments of the invention also provide a method of connecting two optical contacts together, one of the two optical contacts being of the male type as defined above, and the other of the two optical contacts being, as defined above, of female type, and having a ferrule including at least one housing for receiving a pin of a male-type contact;

the method comprising the following steps:
a first alignment step in which at least one side of the ferrule of the female-type contact is caused to slide against at least one arm of the body of the male-type contact; and
a second alignment step in which at least one pin of the male-type contact is inserted into said housing of the ferrule of the female-type contact.

BRIEF DESCRIPTION OF THE DRAWINGS

The invention can be better understood on reading the following description of non-limiting embodiments thereof and on examining the accompanying drawings, in which:

FIGS. 7 and 8 show two steps during the connection of the contact shown in FIG. 5 with the contact shown in FIG. 6; and FIG. 9 is a diagram of a unit including a plurality of FIG. 1 contacts.

FIG. 1 shows an optical contact given overall reference 1 and constituting a first embodiment of the invention.

MORE DETAILED DESCRIPTION

Figure 1:
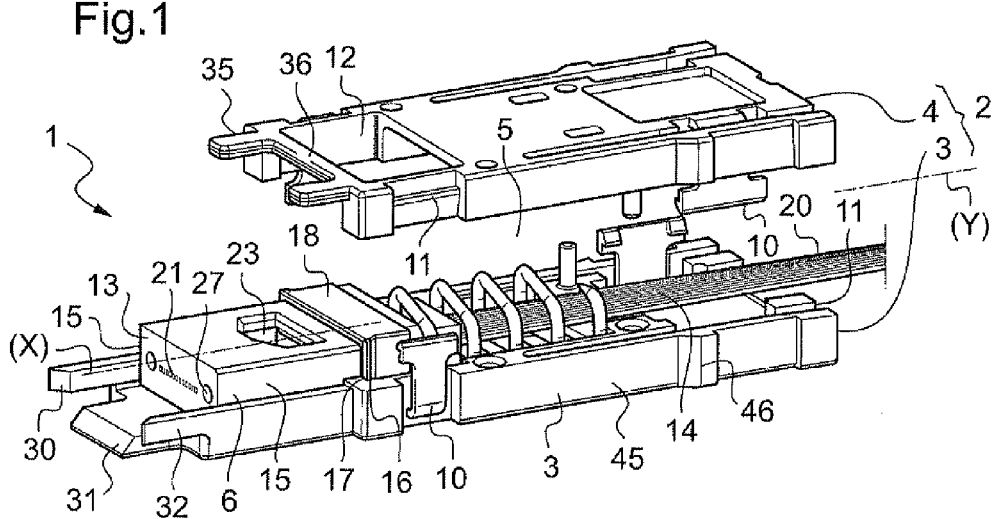
FIG. 1 is an exploded view of a contact constituting an embodiment of the invention.
Figure 2:
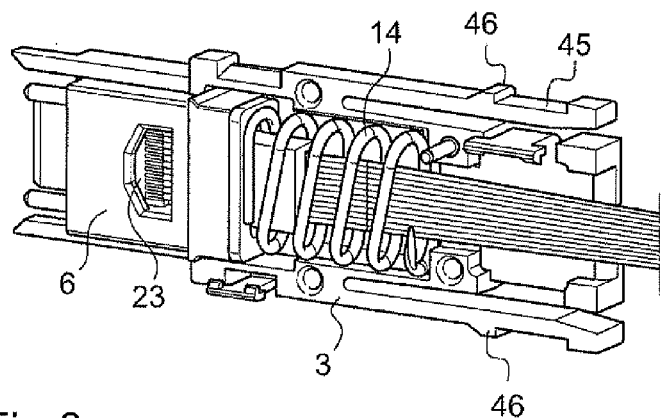
FIGS. 2 to 4 show various steps in assembling the body of the FIG. 1 contact.
Figure 3:
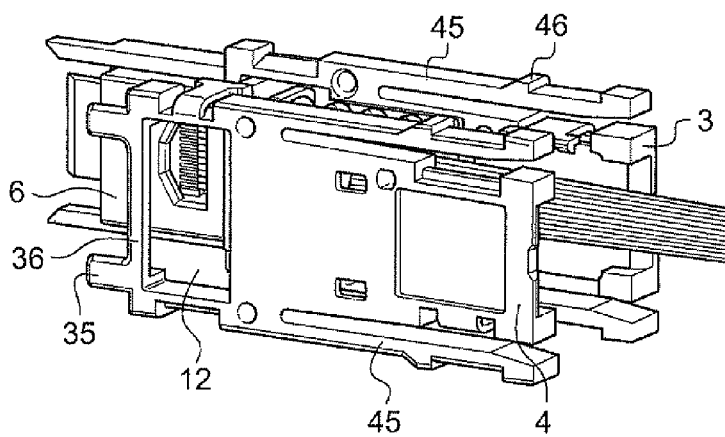
Figure 4:
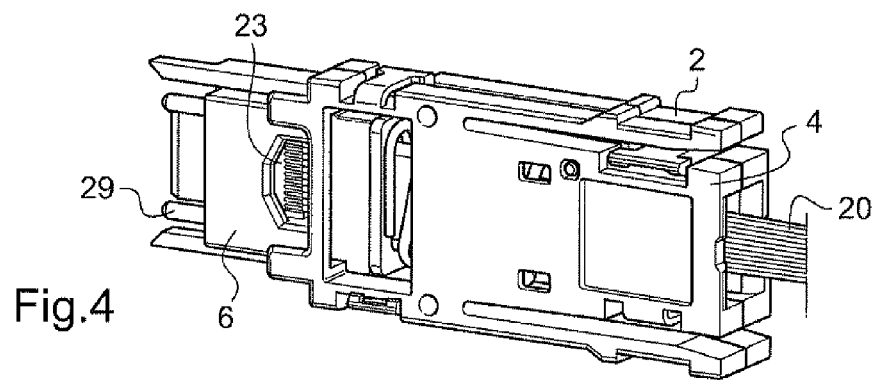

The optical contact 1 comprises a body that, in the example shown, is made up of two parts 3 and 4. Each of the parts 3 and 4 may define substantially one-half of the body, however the invention is not limited to any particular number of parts for making up the body 2, nor to parts forming only body portions having the same dimensions. When they are assembled together, these parts 2 and 3 form a unit in the form of a rectangular parallelepiped along an axis Y, said unit defining a housing 5 in which a ferrule is received that is given overall reference 6 and that is described below.

As shown in FIG. 1, each of the parts 3 and 4 includes means for assembling the parts together. By way of example, these means may be in the form of elastically-deformable tabs 10 that co-operate with grooves or slots 11 so as to assemble the parts 3 and 4 together. The part 3 could have tabs 10 only and the part 4 could have slots or grooves 11 only suitable for co-operating with the tabs 10 of the part 3, or vice versa.

In another variant, the parts 3 and 4 have both tabs 10 and slots or grooves 11. These assembly means 10 and 11 are advantageously configured to make it easy to assemble and disassemble the parts 3 and 4 forming the body 2. In the example described, the assembly means 10 and 11 are also configured to enable assembly to be performed by exerting forces on the parts 3 and 4 of the body, which forces are directed perpendicularly to the longitudinal axis Y of the body 2.

As can be seen in the figures, each part 3 and 4 may include a cavity 12, these cavities being arranged in such a manner that when the parts 3 and 4 are assembled together to form the body 2, the cavities 12 are superposed. As can be seen in the figures, a spring 14 may be arranged inside the body 2, the spring 14 being specifically a compression spring arranged to exert a force parallel to the axis Y.

At least some of the parts of the body 2, or indeed all of them, may be made of plastics material.

The ferrule 6 is mounted to move inside the body 2. When the parts 2 and 3 are assembled together, at least a portion 36 of the body surrounds the ferrule 6 on the outside. The ferrule 6 in the example described is of the MT type and of rectangular cross-section relative to a longitudinal axis X of the ferrule. By way of example, the ferrule 6 has a shoulder 16 on its sides 15 for co-operating with a shoulder 17 formed in the inner side faces of the body 2 to define an abutment against forward movement of the ferrule 6 inside the body 2.

The spring 14 may include one end that bears directly or indirectly against the ferrule 6, with the compression of the spring defining an abutment against rearward movement of the ferrule 6 inside the body 2. In the example under consideration, the longitudinal axis X of the ferrule coincides with the longitudinal axis Y of the body 2 when the ferrule 6 is in place inside the body 2.

The rear face 18 of the ferrule 6 includes a cavity enabling a bundle of covered optical fibers 20 to enter therein. The front face 19 of the ferrule 6 in the example under consideration includes a cavity 21, the bundle of optical fibers 20 extending between the cavity in the rear face 18 and the cavity 21 inside the ferrule 6, for example.

As shown in the figures, the top and/or bottom face of the ferrule may present a cutout 23 through which the ribbon 20 is visible when the ribbon passes through the ferrule 6.

Figure 5:
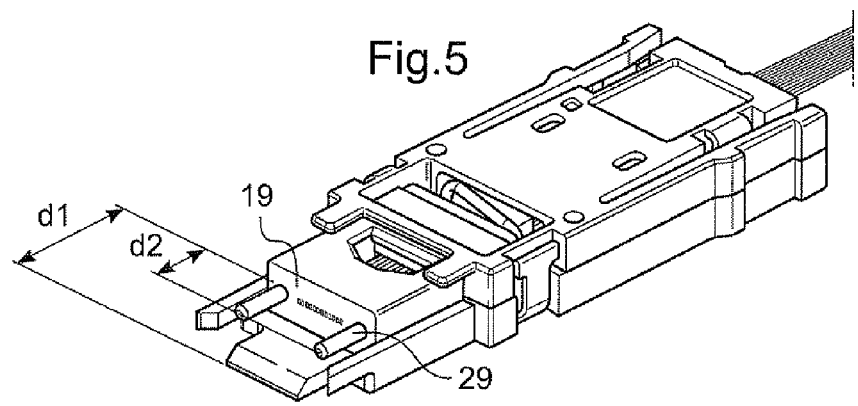
FIGS. 5 and 6 show respectively a male-type contact and a female-type contact.

In the example described, the front face 19 of the ferrule 6 also includes two openings 27 through which two housings 28 open out, which housings have pins 29 received therein when the contact 1 is of the male type, as shown in FIG. 5.

As can be seen in the figures, the front end of the body 2 that is to come into contact with a contact of complementary type during a connection operation includes a portion that extends along the axis X of the ferrule beyond the ferrule 6 towards the outside thereof when the ferrule is placed in the body 2, and for any position thereof inside the body 2 between the front and rear abutments. In the example of FIG. 1, this portion includes:
two arms 30 and 32 extending portions of the body 2 placed facing the sides 15 of the ferrule 6; and
a projection 31 arranged between the two arms 30 and 32.
In the example under consideration, these elements 30, 31, 32 are carried by only one of the parts forming the body 2, i.e.

the part 3. The other part 4 forming the body 2 does not have any such elements 30 to 32. The front end along the axis Y of the body 2 of said other part 4 includes a portion 35 beyond which the ferrule 6 can extend in certain positions thereof, in particular in positions close to the position constituting a rear abutment for its movement inside the body 2.

As can be seen in FIG. 5, when the ferrule 6 of a male-type contact is in its forward abutment position, the elements 30 to 32 extend beyond the front face 19 of the ferrule 6 over a first distance $d_1$, said first distance $d_1$ being greater than the second distance $d_2$ along which the pins 29 of the ferrule 6 extend beyond said front face 19 when said pins 29 are in place in the housings 28, in particular when the pins 29 extend through the entire ferrule 6.

Figure 6:
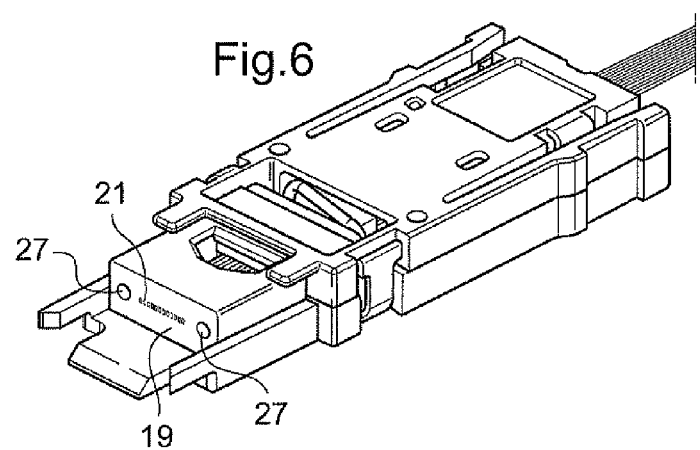

When connecting the contact shown in FIG. 5 with the contact shown in FIG. 6, the contacts are positioned so that the part 2 of each contact faces the part 3 of the other contact, and vice versa. These contacts are then moved towards each other. During a first alignment step, the arms 30 and 32 of the male-type contact shown in FIG. 5 guide the front ends of the sides 15 of the ferrule 6 of the female-type contact shown in FIG. 6, before the ferrule 6 comes into contact with the pins 29 of the ferrule of the male-type contact. Once this first guidance step has been performed, inserting the pins of the ferrule 6 of the male-type contact into the housings 28 of the ferrule of the female-type contact enables a second guidance step to be implemented between the two contacts of male and female type.

Male or female contacts 1 as described above may be received within a unit 40 of a multicontact connector 39, e.g. a multicontact connector.

By way of example, the unit 40 is configured to receive at least one optical contact, e.g. two to ten contacts. As shown in FIG. 9, these contacts may be superposed when they are received in the unit 40. The contacts and the unit 40 may include means enabling the contacts to be mounted removably in the unit. By way of example, these may be tongues 45 carried on each side face of the body 2, in particular by the side face of each of the parts 3 and 4 forming the body 2, these tongues being pivotable and carrying one or more portions in relief 46 capable of co-operating with one or more grooves 48 formed in the wall of the unit 40.

The invention is not limited to the examples described above.

What is claimed is:

1. An optical contact comprising:
   a ferrule extending along a longitudinal axis, the ferrule having a front face facing a complementary ferrule of an optical contact of complementary type when said optical contact is connected to said optical contact of complementary type, and a rear face opposite from said front face; and
   a body within which the ferrule is received, the body being a distinctive part of the ferrule and being configured to receive only one ferrule, the body including at least one portion surrounding the outside of the ferrule around the longitudinal axis thereof, and at least one portion extending beyond the rear face of the ferrule towards the outside thereof, the body being made up of at least two parts, each of the parts including means for enabling one part to be releasably assembled with another part, the means being configured so that the parts are assembled and disassembled by exerting a force on the parts perpendicular to the longitudinal axis of the ferrule;
   wherein the end of the body facing an optical contact of complementary type when said optical contact is connected to said optical contact of complementary type includes at least one arm extending beyond the front face of the ferrule towards the outside thereof, for any position of the ferrule inside the body, the arm being integral with the body, the arm being adapted to slide on and guide a side surface of the complementary ferrule of the complementary type optical contact and by the fact that said end of the body also includes at least one portion beyond which the front face of the ferrule extends.

2. A contact according to claim 1, the ferrule being mounted inside the body to be movable along an axis parallel to its longitudinal axis.

3. A contact according to claim 2, including a spring mounted in the body and having an end that presses against the rear face of the ferrule.

4. A contact according to claim 2, the ferrule having a rectangular cross-section and each side of the ferrule including a shoulder that comes into abutment against a shoulder of the body to define an abutment against forward movement of the ferrule inside the body.

5. A contact according to claim 1, the contact being of the male type and including at least one pin and a housing for receiving said pin, the pin being arranged parallel to the axis of the ferrule when it is mounted in said housing, the pin extending beyond the front face of the ferrule towards the outside thereof over a second distance, said arm of the body extending beyond the front face of the ferrule over a first distance that is greater than the second distance.

6. A contact according to claim 5, wherein the contact includes two arms, each of said arms extending a wall of the body that is in contact with a side of the ferrule.

7. A contact according to claim 1, said portion of said end of the body that extends beyond the front face of the ferrule being carried by only one of said parts of the body, and said portion of said end of the body beyond which the front face of the ferrule can extend being carried by another one of said parts forming the body.

8. A contact according to claim 1, the body being made up of two parts, and each part including a cutout in a side face such that when the two parts are assembled together, the cutouts face each other.

9. A multicontact connector including a unit in which at least one contact according to claim 1 is received.

10. A method of connecting two optical contacts together, one of the two optical contacts being of the male type and including at least one pin and a housing for receiving said pin, the pin being arranged parallel to the axis of the ferrule when it is mounted in said housing, the pin extending beyond the front face of the ferrule towards the outside thereof over a second distance, said arm of the body extending beyond the front face of the ferrule including at least one arm extending beyond the front face of the ferrule towards the outside thereof over a first distance that is greater than the second distance, and the other of the two optical contacts being according to claim 1, being of female type, and having a ferrule including at least one housing for receiving a pin of a male-type contact;
   the method comprising the following steps:
   a first alignment step in which at least one side of the ferrule of the female-type contact is caused to slide against at least one arm of the body of the male-type contact; and
   a second alignment step in which at least one pin of the male-type contact is inserted into said housing of the ferrule of the female-type contact.

11. A contact according to claim 1 wherein the ferrule is received in the body in a moveable manner.

12. A contact according to claim 11, the ferrule being mounted inside the body to be movable along an axis parallel to its longitudinal axis.

13. A contact according to claim 11, the contact being of the male type and including at least one pin and a housing for receiving said pin, the pin being arranged parallel to the axis of the ferrule when it is mounted in said housing, the pin extending beyond the front face of the ferrule towards the outside thereof over a second distance, said portion of the body extending beyond the front face of the ferrule including at least one arm extending beyond the front face of the ferrule towards the outside thereof over a first distance that is greater than the second distance.

14. A contact according to claim 11, the body being made up of at least two parts, each of said parts including means enabling a part to be releasably assembled with another part, said means being configured in such a manner that assembly and disassembly of said parts take place by exerting a force on the parts perpendicularly to the longitudinal axis of the ferrule.

15. A multicontact connector including a unit in which at least one contact according to claim 11 is received.

16. A method of connecting two optical contacts together, one of the two optical contacts being of the male type and including at least one pin and a housing for receiving said pin, the pin being arranged parallel to the axis of the ferrule when it is mounted in said housing, the pin extending beyond the front face of the ferrule towards the outside thereof over a second distance, said arm of the body extending beyond the front face of the ferrule including at least one arm extending beyond the front face of the ferrule towards the outside thereof over a first distance that is greater than the second distance, and the other of the two optical contacts being according to claim 11, being of female type, and having a ferrule including at least one housing for receiving a pin of a male-type contact;

the method comprising the following steps:
 a first alignment step in which at least one side of the ferrule of the female-type contact is caused to slide against at least one arm of the body of the male-type contact; and
 a second alignment step in which at least one pin of the male-type contact is inserted into said housing of the ferrule of the female-type contact.

* * * * *